(12) United States Patent
Surace et al.

(10) Patent No.: US 11,674,404 B2
(45) Date of Patent: Jun. 13, 2023

(54) SEAL ASSEMBLY WITH SEAL ARC SEGMENT

(71) Applicant: RAYTHEON TECHNOLOGIES CORPORATION, Farmington, CT (US)

(72) Inventors: Raymond Surace, Newington, CT (US); Howard J. Liles, Newington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 114 days.

(21) Appl. No.: 17/307,139

(22) Filed: May 4, 2021

(65) Prior Publication Data

US 2022/0356810 A1 Nov. 10, 2022

(51) Int. Cl.
*F01D 11/08* (2006.01)
*F01D 9/04* (2006.01)
(Continued)

(52) U.S. Cl.
CPC ............... *F01D 11/08* (2013.01); *F01D 9/04* (2013.01); *F01D 11/001* (2013.01);
(Continued)

(58) Field of Classification Search
CPC ........ F01D 9/04; F01D 11/001; F01D 11/005; F01D 9/042; F05D 2240/11; F05D 2240/56
See application file for complete search history.

(56) References Cited

U.S. PATENT DOCUMENTS

| | | | |
|---|---|---|---|
| 2,221,684 A | 11/1940 | Smith | |
| 6,316,048 B1 * | 11/2001 | Steibel | ................ C04B 41/5059 427/427 |

(Continued)

FOREIGN PATENT DOCUMENTS

| | | |
|---|---|---|
| EP | 2172620 | 4/2010 |
| EP | 3088684 | 11/2016 |

(Continued)

OTHER PUBLICATIONS

European Search Report for European Patent Application No. 22170289.7 dated Sep. 26, 2022.

*Primary Examiner* — Eldon T Brockman
(74) *Attorney, Agent, or Firm* — Carlson, Gaskey & Olds, P.C.

(57) ABSTRACT

A seal assembly includes first, second, and third gas turbine engine components, such as vane assemblies, that are successively arranged around an axis. Each component has first and second mate faces such that the first mate face of the first component and the second mate face of the second component define a first mate face gap, and the first mate face of the second component and the second mate face of the third component to define a second mate face gap. A seal arc segment has first and second seal portions and a connector portion that joins the seal portions. The first seal portion bridges the first mate face gap to seal the first mate face gap, the second seal portion bridges the second mate face gap to seal the second mate face gap, and the connector portion spans circumferentially across the second component.

18 Claims, 4 Drawing Sheets

(51) Int. Cl.
   *F01D 11/00* (2006.01)
   *F01D 25/12* (2006.01)
   *F02C 7/28* (2006.01)

(52) U.S. Cl.
   CPC ............ *F01D 11/005* (2013.01); *F01D 25/12* (2013.01); *F02C 7/28* (2013.01); *F05D 2220/323* (2013.01); *F05D 2240/11* (2013.01); *F05D 2240/56* (2013.01); *F05D 2260/201* (2013.01); *F05D 2300/6033* (2013.01)

(56) References Cited

U.S. PATENT DOCUMENTS

| | | |
|---|---|---|
| 6,343,912 B1 | 2/2002 | Manteiga et al. |
| 6,439,844 B1* | 8/2002 | Turnquist .............. F16J 15/442 |
| | | 415/173.5 |
| 6,503,051 B2 | 1/2003 | Predmore |
| 9,500,095 B2* | 11/2016 | Pietrobon ............... F01D 25/12 |
| 9,850,775 B2* | 12/2017 | Pietrobon ............... F01D 11/24 |
| 10,570,765 B2 | 2/2020 | Propheter-Hinckley |
| 10,738,620 B2* | 8/2020 | Anderson ................ F01D 5/18 |
| 11,078,802 B2* | 8/2021 | Razzell .................. F16J 15/106 |
| 2002/0071764 A1* | 6/2002 | Turnquist ............... F01D 5/225 |
| | | 415/173.5 |
| 2014/0255174 A1* | 9/2014 | Duelm .................. F01D 25/162 |
| | | 156/185 |
| 2014/0271105 A1* | 9/2014 | Pietrobon ............... F01D 11/08 |
| | | 415/185 |
| 2019/0323358 A1* | 10/2019 | Anderson ................ F01D 5/18 |
| 2020/0355089 A1* | 11/2020 | Razzell .................. F01D 11/08 |

FOREIGN PATENT DOCUMENTS

| | | |
|---|---|---|
| EP | 3557001 | 10/2019 |
| GB | 2235253 | 2/1991 |
| WO | 2014100347 | 6/2014 |

* cited by examiner

SEAL ASSEMBLY WITH SEAL ARC SEGMENT

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature gas flow. The high-pressure and temperature gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A seal assembly according to an example of the present disclosure includes first, second, and third gas turbine engine components that are successively arranged around an axis. Each of the first, second, and third gas turbine engine components has first and second mate faces such that the first mate face of the first gas turbine engine component is adjacent to the second mate face of the second gas turbine engine component to define a first mate face gap there between and the first mate face of the second gas turbine engine component is adjacent to the second mate face of the third gas turbine engine component to define a second mate face gap there between. A seal arc segment is arranged around the axis. The seal arc segment has first and second seal portions that are circumferentially spaced-apart and a connector portion joining the first and second seal portions. The seal arc segment is arranged such that the first seal portion bridges the first mate face gap to seal the first mate face gap. The second seal portion bridges the second mate face gap to seal the second mate face gap, and the connector portion spans circumferentially across the second gas turbine engine component.

In a further embodiment of any of the foregoing embodiments, the connector portion includes at least one opening.

In a further embodiment of any of the foregoing embodiments, the second gas turbine engine component includes a collar that extends through the single opening.

In a further embodiment of any of the foregoing embodiments, the first and second mate face gaps each define a mate face gap length, and each of the first and second seal portions extend along a majority of the mate face gap length.

In a further embodiment of any of the foregoing embodiments, the first and second seal portions extend over a middle section of the mate face gap length and opposed end sections of the mate face gap length extend forward of and aft of the first and second seal portions.

In a further embodiment of any of the foregoing embodiments, the seal arc segment is formed of ceramic matrix composite.

In a further embodiment of any of the foregoing embodiments, the seal arc segment includes at least one impingement hole.

In a further embodiment of any of the foregoing embodiments, there is a cavity defined between the connector portion of the seal arc segment and a radial surface of the second gas turbine engine component, and the at least one impingement hole opens to the cavity.

A further embodiment of any of the foregoing embodiments includes at least one brush seal that seals against a radially outer surface of the seal arc segment.

In a further embodiment of any of the foregoing embodiments, the first, second, and third gas turbine engine components are vane assemblies.

In a further embodiment of any of the foregoing embodiments, each of the vane assemblies includes a ceramic matrix composite airfoil fairing that has inner and outer platforms and an airfoil section that extends there between. The outer platform has forward and aft flanges, and the seal arc segment extends between the forward and aft flanges of each of the vane assemblies.

In a further embodiment of any of the foregoing embodiments, the seal arc segment is formed of a ceramic matrix composite. The ceramic matrix composite and the ceramic matrix composite airfoil fairing have equivalent compositions.

A gas turbine engine according to an example of the present disclosure includes a compressor section, a combustor in fluid communication with the compressor section, and a turbine section in fluid communication with the combustor. The turbine section has first, second, and third vane assemblies that are successively arranged around an axis. Each of the first, second, and third vane assemblies has first and second mate faces such that the first mate face of the first vane assembly is adjacent to the second mate face of the second vane assembly to define a first mate face gap there between and the first mate face of the second vane assembly is adjacent to the second mate face of the third vane assembly to define a second mate face gap there between. A seal arc segment arranged around the axis. The seal arc segment has first and second seal portions that are circumferentially spaced-apart and a connector portion joining the first and second seal portions. The seal arc segment is arranged such that the first seal portion bridges the first mate face gap to seal the first mate face gap. The second seal portion bridges the second mate face gap to seal the second mate face gap, and the connector portion spans circumferentially across the second gas turbine engine component.

A further embodiment of any of the foregoing embodiments includes a brush seal that seals against a radially outer surface of the seal arc segment.

In a further embodiment of any of the foregoing embodiments, each of the first, second, and third vane assemblies includes a ceramic matrix composite airfoil fairing that has inner and outer platforms and an airfoil section that extends there between. The outer platform has forward and aft flanges, and the seal arc segment extends between the forward and aft flanges of each of the first, second, and third vane assemblies.

In a further embodiment of any of the foregoing embodiments, the first and second mate face gaps each define a mate face gap length, and each of the first and second seal portions extend along a majority of the mate face gap length.

In a further embodiment of any of the foregoing embodiments, the first and second seal portions extend over a middle section of the mate face gap length and opposed end sections of the mate face gap length extend forward of and aft of the first and second seal portions.

In a further embodiment of any of the foregoing embodiments, the seal arc segment is formed of ceramic matrix composite.

In a further embodiment of any of the foregoing embodiments, the connector portion includes a single opening and the second vane assembly includes a collar that extends through the single opening.

In a further embodiment of any of the foregoing embodiments, the seal arc segment includes at least one impingement hole.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
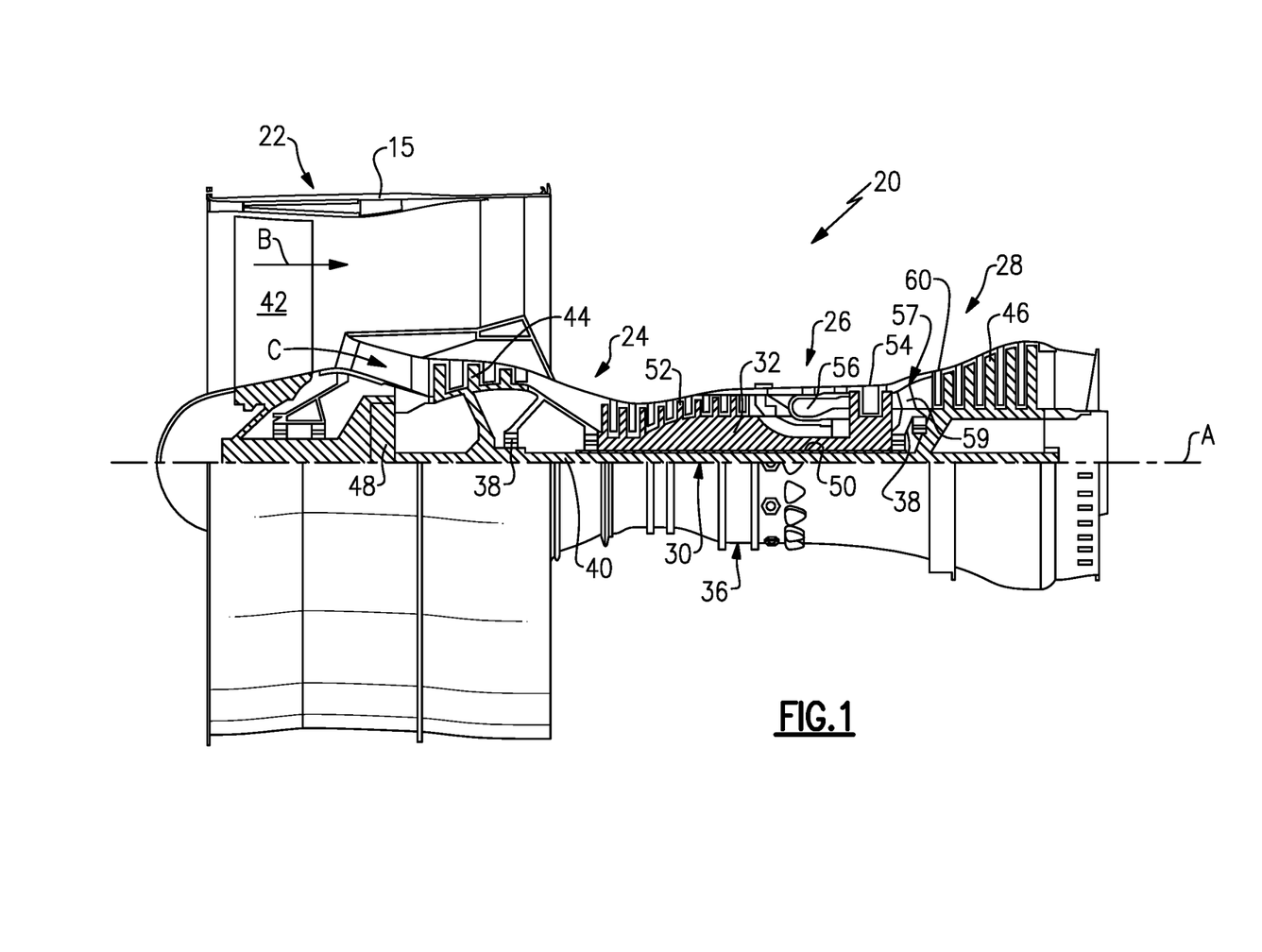
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of [(Tram° R) / (518.7° R)]$^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
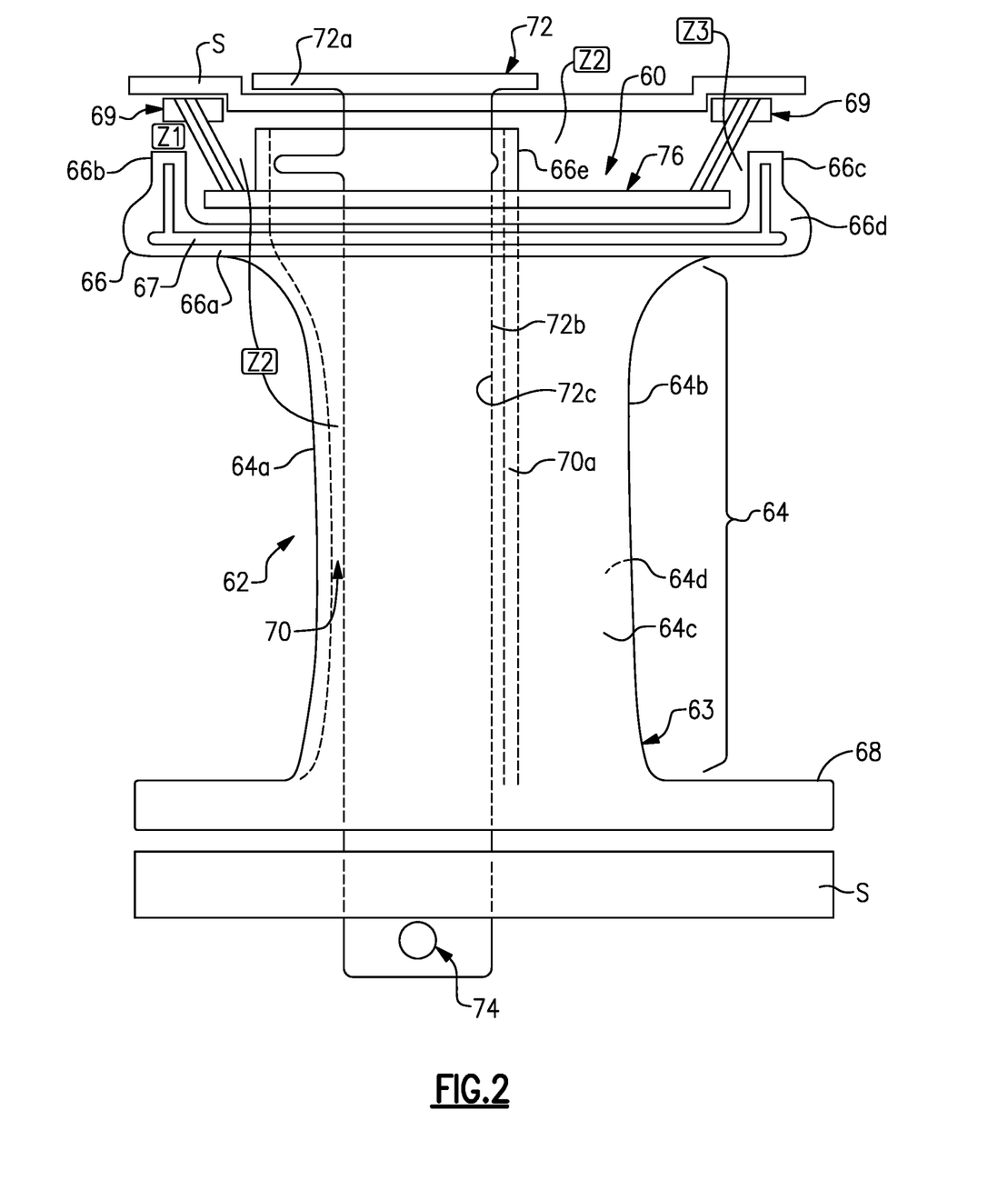
FIG. 2 illustrates a seal assembly with a gas turbine engine component.

FIG. 2 illustrates an example implementation of a seal assembly 60 in the turbine section 28 of the engine 20 (see also FIG. 1). The seal assembly 60 is employed with a plurality of gas turbine engine components 62 (one shown in FIG. 2) that are arranged circumferentially around the central engine axis A. In this example, the gas turbine engine components 62 are vane assemblies, but it is to be understood that the seal assembly 60 may be employed with other components that border the core gas path of the engine 20 and have mate face gaps, such as outer air seals.

The vane assemblies 62 each include an airfoil fairing 63 that is comprised of an airfoil section 64 and first and second platforms 66/68 between which the airfoil section 64 extends. The platform 66 includes a base wall 66a, forward and aft flanges 66b/66c that protrude radially from the base wall 66a, and mate faces 66d. The mate faces 66d are the circumferential sides of the platform 66 and may include a slot 67 for receiving a feather seal (not shown). Brush seals 69 are provided at the forward and trailing ends of the platform 66 to facilitate isolating a plenum region bounded by the base wall 66a and the flanges 66b/66c. In this example, the platform 66 also includes a collar 66e that protrudes radially from the base wall 66a. Although not shown, the platform 68 may also have one or more flanges, which may serve to transfer aerodynamic loads from the airfoil fairing 63. In addition, platform 66 may have protruding flanges instead or, or in addition to, the collar. In the example shown in FIG. 2 the first platform 66 is an outer platform and the second platform 68 is an inner platform. The terms such as "inner" and "outer" used herein refer to location with respect to the central engine axis A, i.e., radially inner or radially outer. Moreover, the terminology "first" and "second" used herein is to differentiate that there are two architecturally distinct components or features. It is to be further understood that the terms "first" and "second" are interchangeable in that a first component or feature could alternatively be termed as the second component or feature, and vice versa.

The airfoil section 64 generally extends in a radial direction relative to the central engine axis A and defines leading and trailing edges 64a/64b, a suction side 64c, and a pressure side 64d. The airfoil section 64 is hollow and circumscribes an interior through-cavity 70. The airfoil section 64 may have a single through-cavity 70, or the cavity 70 may be sub-divided by one or more ribs. In the example shown, the airfoil fairing includes one rib 70a that sub-divides the cavity 70 into forward and aft sub-cavities. The aforementioned collar 66e is an extension of a tube that forms the rib 70a and the forward sub-cavity in the airfoil section 64.

The airfoil fairing 63 is a continuous, one-piece body. As an example, the airfoil fairing 63 is formed of a ceramic material or a metal matrix composite (MMC). For instance, the material is a ceramic matrix composite, or a metal matrix composite (MMC). In one example, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example metal matrix composites include, but are not limited to, boron carbide fiber tows and/or alumina fiber tows disposed in a metal matrix, such as aluminum. The fiber tows are arranged in a fiber architecture, which refers to an ordered arrangement of the tows relative to one another, such as a 2D woven ply (e.g. a braid) or a 3D structure.

The vane assembly 62 further includes a spar 72 that extends through the through-cavity 70 (e.g., the forward sub-cavity) and mechanically supports the airfoil fairing 63. The spar 72 may be formed of a relatively high temperature resistance, high strength material, such as a nickel or cobalt based superalloy (e.g. a single crystal nickel alloy). The spar 72 includes a spar flange 72a and a spar leg 72b that extends from the spar flange 72a, through the collar 66e of the platform 66, and into the through-cavity 70 (e.g., the forward sub-cavity). The spar leg 72b defines an interior through-passage 72c, and the spar flange 72a is supported at an outer end to support hardware S.

The spar leg 72b has an inner end portion that has an attachment 74, such as but not limited to, a pin. The inner end of the spar leg 72b extends past the platform 68 of the airfoil fairing 63 so as to protrude from the fairing 63. The inner end is attached (e.g., by the pin) to additional support hardware S adjacent the platform 68 of the airfoil fairing 63. The airfoil fairing 63 is thus trapped between the inner support hardware S and the spar flange 72a and outer support hardware S.

Airflow, such as bleed air from the compressor section 24, is provided in and around the vane assembly to meet various objectives. For instance, in zone Z1 air is used to purge the region around the forward flange 66b and brush seal 69. In zone Z2 air is used to cool the region of the leading edge 64a of the airfoil section 64; and in zone Z3 air may be used to purge the region around aft flange 66c. The pressures across the zones Z1/Z2/Z3 are different and to the extent that air is permitted to leak from the zones, the above objectives may be frustrated. Moreover, since zone Z3 is at the lowest pressure, air from the zones Z1 and Z2 tends to leak to zone Z3. In this regard, the seal assembly 60 facilitates isolation of the zones Z1/Z2/Z3.

Figure 3:
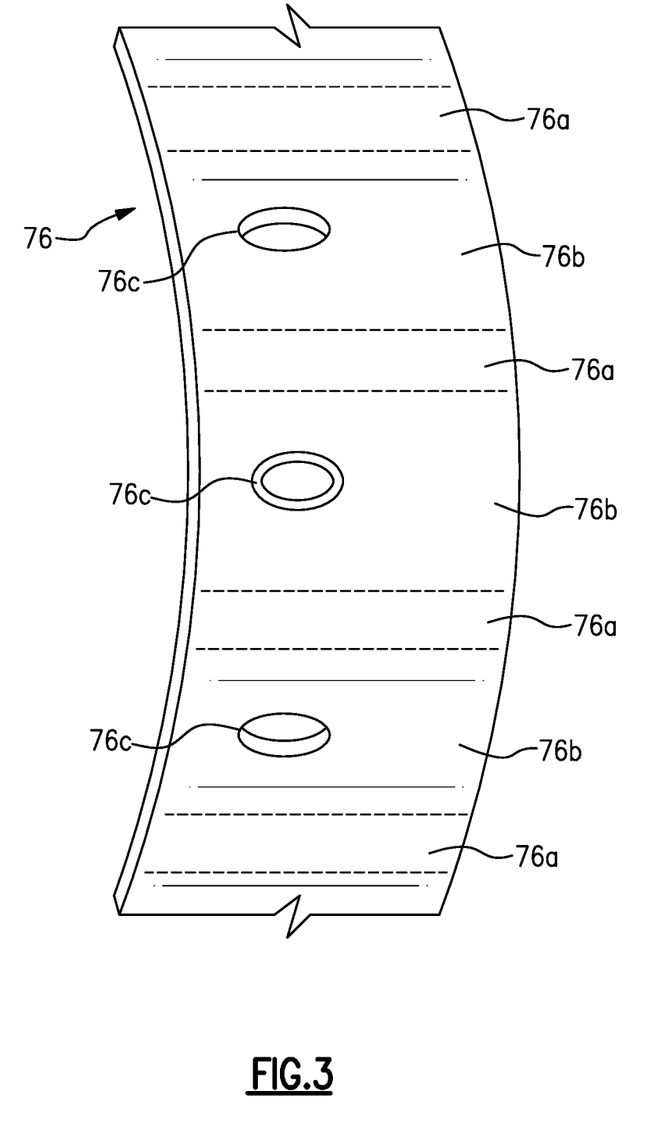
FIG. 3 illustrates an isolated view of a seal arc segment.

The seal assembly 60 is implemented at the outer platforms 66 of the airfoil fairings 63 and includes a seal arc segment 76. FIG. 3 illustrates an isolated view of the seal arc segment 76. As the phrase "seal arc" indicates, the seal arc segment 76 is a sector of a circular ring. In this regard, the seal arc segment 76 spans across at least three or more vane assemblies 62. For instance, multiple seal arc segments 76 would make a full ring, such as bi-segment halves, tri-segment thirds, or quad-segment quarters in a ring.

Each seal arc segment 76 includes seal portions 76a that are circumferentially spaced-apart and a connector portions 76b that join the seal portions 76b such that there are alternating seal portions 76a and connector portions 76b. In this example, each of the connector portions 76b includes an opening 76c to receive the collar 66e there through. The opening 76c is completely bound within the connector portion 76b and the shape of the opening 76c is a complement of the shape of the collar 66e such that the collar 66e fits closely through the opening 76c.

The seal arc segment 76 may be formed of a metal alloy, such as a nickel- or cobalt-based alloy, or a ceramic matrix composite. In one example, the airfoil fairing 63 and the seal arc segment 76 are both formed of CMCs. In a further example, the CMCs of the airfoil fairing 63 and the seal arc segment 76 are of equivalent compositions. For instance, the equivalent compositions have the same kind of fibers (e.g., silicon carbide) and the same kind of matrix (e.g., silicon carbide) however the layup architecture (weave, braid, unitape, etc.) may be different.

Figure 4:
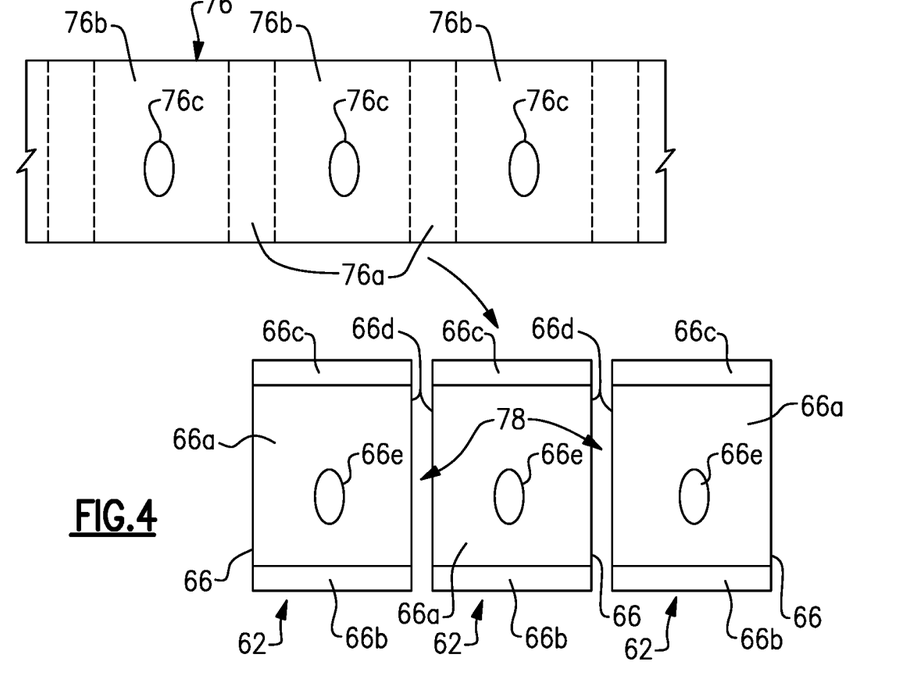
FIG. 4 illustrates an exploded view of the seal arc segment and plurality of vane assemblies.
Figure 5:
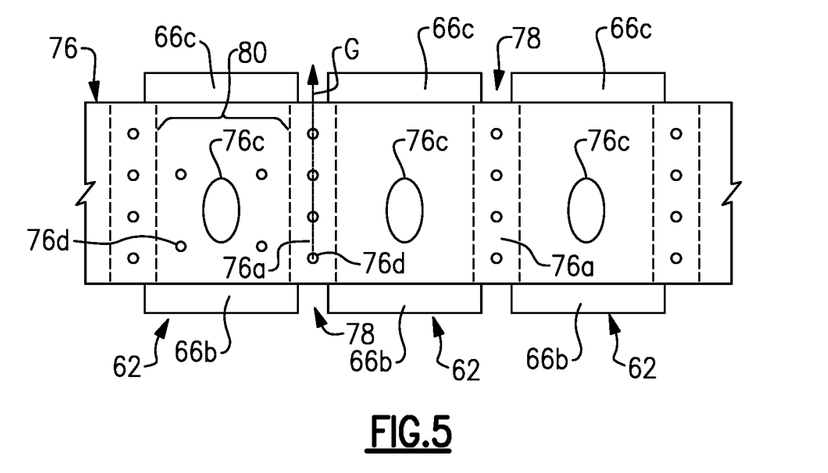
FIG. 5 illustrates a seal arc segment on a plurality of vane assemblies.

As shown in FIGS. 4 and 5, the vane assemblies 62 are circumferentially successively arranged such that the (first) mate face 66d of the first one of the vane assemblies (the left-most) is adjacent the (second) mate face 66d of the second one of the vane assemblies (the middle) to define a (first) mate face gap 78 there between. The (first) mate face 66d of the second (middle) one of the vane assemblies 62 is adjacent the (second) mate face 66d of the third one of the vane assemblies (right-most) to define a (second) mate face gap 78 there between.

The seal arc segment 76 is received onto the platforms 66 of the three circumferentially successive vane assemblies 62. The collars 66e fit into the openings 76c in the connector portions 76b of the seal arc segments 76, which may also serve as pilots for proper location of the seal arc segment 76. The seal arc segment 76 is situated on the base walls 66a of the platforms 66 (see also FIG. 2) axially between the flanges 66b/66c such that the connector portions 76b span circumferentially across the base walls 66a. The seal portions 76a contact the base walls 66a of the adjacent platforms 66 and bridge across the mate face gaps 78 to seal the mate face gaps 78. The brush seals 69 (FIG. 2) contact the outer surface of the seal arc segment 76 to seal therewith.

Although feather seals may be used in the slots 67 for sealing the mate faces 66d, the seal portions 76a that bridge over the mate face gaps 78 provide additional sealing against infiltration of hot gas from the core gas path and/or the escape of cooling air from zone Z2. This additional sealing, together with the sealing provided by the brush seals 69, thereby facilitates the isolation of zone Z2 from zones Z1 and Z3. The seal arc segment 76 may also serve as a thermal shield to protect the brush seals 69 from high temperatures that may be experienced in the platform 66. In this regard, forming the seal arc segment 76 from a relatively low thermal conductivity material (in comparison to metals), such as the CMC discussed above, facilitates enhancement of thermal shielding. Alternatively, a metal arc seal segment may be coated with a thermal barrier coating such as yttria stabilized zirconia.

As also shown in FIG. 5, the mate face gaps 78 each define a mate face gap length G, which is equal to the axial length of the platforms 66. As the seal arc segments 76 are located between the flanges 66b/66c, the seal portions 76a extend only along a majority of the mate face gap length G rather than the full extent of the mate face gap length G. For instance, as shown in FIG. 5, the seal portions 76a extend over the middle section of the mate face gap length G and opposed end sections of the mate face gap length G extend forward of and aft of the seal portions 76a. Thus, the seal portions 76a do not seal the entire mate face gap 78, and the end sections of the mate face gap length G rely on only the sealing provided by the feather seals.

Optionally, as shown in FIG. 5, the seal portions 76a may include one or more impingement holes 76d. Cooling air that is provided into zone Z2 (see FIG. 2) is discharged through the impingement holes 76d into the mate face gaps 78. The size and number of impingement holes 76d may be selected to meter the amount of cooling air provided, to cool the feather seal and/or cool the mate faces 66d. The impingement holes 76d may also be placed in other regions of the seal portion 76b to cool specific areas of the platform 66.

Optionally, the perimeter surface regions of the fairing platforms 66 that are in contact with the seal portions 76a may include a coating, for thermal considerations, to smooth the surface for better sealing contact, and/or reduce wear. For example, the coating is selected of a composition that is thermally insulating in comparison to the CMC (if used) of the airfoil fairings 63, to thermally insulate the seal arc segment 76. The coating may be composed of elemental silicon, silicate, silica, hafnia, zirconia, or combinations thereof. As the coating may be only on the perimeter portions of the platforms, including along the mate face edges 66d, there may be a cavity 80 defined between the seal arc segment 76, the radial surface of the platform 66, and the coating. One or more impingement holes 76d may be provided in the connector portions 76b that open to the cavity 80 to provide cooling to the surface of the platform 66 and thereby facilitate control over the temperature of regions in contact with the brush seals 69.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A seal assembly comprising:
first, second, and third vane assemblies that are successively arranged around an axis, each of the first, second, and third vane assemblies including a ceramic matrix composite airfoil fairing having inner and outer platforms and an airfoil section that extends there between, the outer platform having a base wall and forward and aft flanges protruding radially from the base wall, each of the first, second, and third vane assemblies having first and second mate faces such that the first mate face of the first vane assembly is adjacent to the second mate face of the second vane assembly to define a first mate face gap there between and the first mate face of the second vane assembly is adjacent to the second mate face of the third vane assembly to define a second mate face gap there between; and
a seal arc segment arranged around the axis, the seal arc segment having first and second seal portions that are circumferentially spaced-apart and a connector portion joining the first and second seal portions, the seal arc segment extending between the forward and aft flanges of each of the vane assemblies and being arranged such that the first seal portion contacts the base wall of the outer platform of each of the first and second vane assemblies and bridges the first mate face gap to seal the first mate face gap, the second seal portion contacts the base wall of the outer platform of each of the second and third vane assemblies and bridges the second mate face gap to seal the second mate face gap, and the connector portion spans circumferentially across the second vane assembly.

2. The seal assembly as recited in claim 1, wherein the connector portion includes at least one opening.

3. The seal assembly as recited in claim 2, wherein the second vane assembly includes a collar that extends through the at least one opening.

4. The seal assembly as recited in claim 1, wherein the first and second mate face gaps each define a mate face gap length, and each of the first and second seal portions extend along a majority of the mate face gap length.

5. The seal assembly as recited in claim 4, wherein the first and second seal portions extend over a middle section of the mate face gap length and opposed end sections of the mate face gap length extend forward of and aft of the first and second seal portions.

6. The seal assembly as recited in claim 1, wherein the seal arc segment is formed of ceramic matrix composite.

7. The seal assembly as recited in claim 1, wherein the seal arc segment includes at least one impingement hole.

8. The seal assembly as recited in claim 7, wherein there is a cavity defined between the connector portion of the seal arc segment and a radial surface of the second vane assembly, and the at least one impingement hole opens to the cavity.

9. The seal assembly as recited in claim 1, further comprising at least one brush seal that seals against a radially outer surface of the seal arc segment.

10. The seal assembly as recited in claim 1, wherein the seal arc segment is formed of a ceramic matrix composite, the ceramic matrix composite and the ceramic matrix composite airfoil fairing having equivalent compositions.

11. A gas turbine engine comprising:
a compressor section;
a combustor in fluid communication with the compressor section; and
a turbine section in fluid communication with the combustor, the turbine section including:
first, second, and third vane assemblies that are successively arranged around an axis, each of the first, second, and third vane assemblies having first and second mate faces such that the first mate face of the first vane assembly is adjacent to the second mate face of the second vane assembly to define a first mate face gap there between and the first mate face of the second vane assembly is adjacent to the second mate face of the third vane assembly to define a second mate face gap there between;
a seal arc segment arranged around the axis, the seal arc segment having first and second seal portions that are circumferentially spaced-apart and a connector portion joining the first and second seal portions, the seal arc segment being arranged such that the first seal portion bridges the first mate face gap to seal the first mate face gap, the second seal portion bridges the second mate face gap to seal the second mate face gap, and the connector portion spans circumferentially across the second gas turbine engine component; and
a brush seal that seals against a radially outer surface of the seal arc segment.

12. The gas turbine engine as recited in claim 11, wherein each of the first, second, and third vane assemblies includes a ceramic matrix composite airfoil fairing that has inner and outer platforms and an airfoil section that extends there between, the outer platform has forward and aft flanges, and the seal arc segment extends between the forward and aft flanges of each of the first, second, and third vane assemblies.

13. The gas turbine engine as recited in claim 12, wherein the first and second mate face gaps each define a mate face gap length, and each of the first and second seal portions extend along a majority of the mate face gap length.

14. The gas turbine engine as recited in claim 13, wherein the first and second seal portions extend over a middle section of the mate face gap length and opposed end sections of the mate face gap length extend forward of and aft of the first and second seal portions.

15. The gas turbine engine as recited in claim 14, wherein the seal arc segment is formed of ceramic matrix composite.

16. The gas turbine engine as recited in claim 14, wherein the connector portion includes a single opening and the second vane assembly includes a collar that extends through the single opening.

17. The gas turbine engine as recited in claim 14, wherein the seal arc segment includes at least one impingement hole.

18. A seal assembly comprising:
first, second, and third gas turbine engine components that are successively arranged around an axis, each of the first, second, and third gas turbine engine components having first and second mate faces such that the first mate face of the first gas turbine engine component is adjacent to the second mate face of the second gas turbine engine component to define a first mate face gap there between and the first mate face of the second gas turbine engine component is adjacent to the second mate face of the third gas turbine engine component to define a second mate face gap there between;
a seal arc segment arranged around the axis, the seal arc segment having first and second seal portions that are circumferentially spaced-apart and a connector portion joining the first and second seal portions, the seal arc segment being arranged such that the first seal portion bridges the first mate face gap to seal the first mate face gap, the second seal portion bridges the second mate face gap to seal the second mate face gap, and the connector portion spans circumferentially across the second gas turbine engine component; and
at least one brush seal that seals against a radially outer surface of the seal arc segment.

* * * * *